Figure 1:
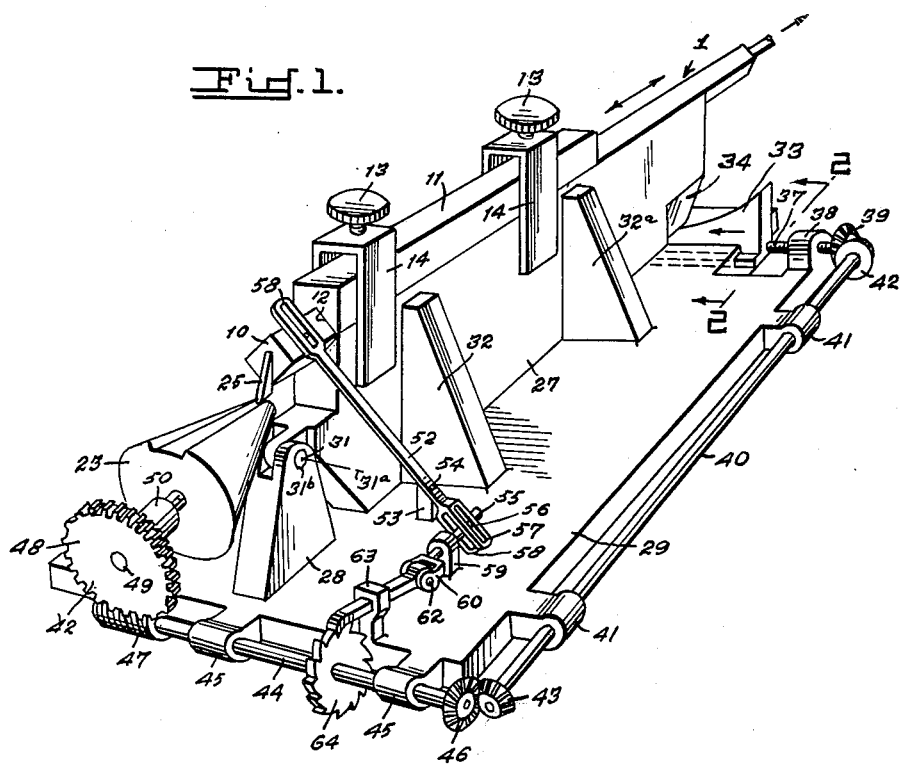

Feb. 2, 1960    C. E. PELANDER    2,923,209
TOOL SHAPING MACHINE
Original Filed March 4, 1958

INVENTOR.
Carl E. Pelander
BY
S. J. Rotondi & A. J. Dupont

United States Patent Office 2,923,209
Patented Feb. 2, 1960

2,923,209

TOOL SHAPING MACHINE

Carl Edward Pelander, McLean, Va., assignor to the United States of America as represented by the Secretary of the Army Original application March 4, 1958, Serial No. 719,175. Divided and this application June 12, 1959, Serial No. 819,784

2 Claims. (Cl. 90—24.3)

(Granted under Title 35, U.S. Code (1952), sec. 266)

The invention described herein may be manufactured and used by or for the Goverment for governmental purposes without the payment to me of any royalty thereon.

This invention relates to a shaping machine and more particularly to a machine for cutting contours that require a geometry having an axis and lines projecting from an outer periphery to a common point intersection.

This application is a division of application, Serial No. 719,175, filed March 4, 1958.

The present method incorporates the use of a three-dimensional pantograph with a master template governing the contour to be machined. The cutter rotates in a spindle, milling the contour into the material. This method has several disadavantages, such as the length of time involved in cutting the desired contour, unsatisfactory surface, difficulty in maintaining a good cutting edge during the machining of certain materials and the inability to machine other than straight or in one plane to the axis of a cone.

With the present invention, the cuts may be made straight from the apex to an outer periphery, helical, and irregular. The apparatus conceived to practice the invention comprises a master template to determine the radial contour of the cross section of the machined surface. A cam can be incorporated to give direction to the cut other than straight from the axis and the shape of the cam determines whether the cut will be straight, helical or irregular to the axis contour of the workpiece to be cut. Among the advantages this machine has over the existing machines are faster operation, a finer surface finish and universality in use of accessories.

It is therefor a primary object of this invention to provide a shaping machine for cutting contours into blocks and or radially about the surface of a conical shaped piece of material.

Another object of the invention is to provide a shaping machine for shaping a contour on a conical workpiece, with the deepest and greatest breadth of cut provided at the greatest diameter of the cone and diminishing proportionally to infinity at the apex, such as might be found in tools such as pipe reamers.

It is a further object of the invention to provide a shaping machine for shaping a contour that will be swift in operation, provide a smooth surface and achieve more flexibility with the use of accessories.

Figure 2:
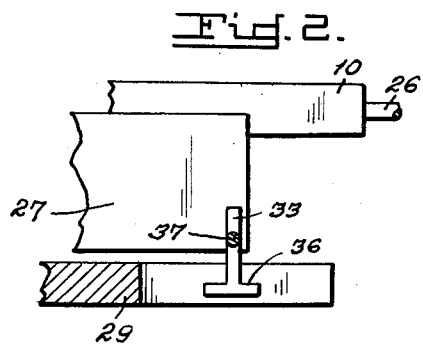

The specific nature of the invention as well as other objects and advantages thereof, will clearly appear from a description of a preferred embodiment as shown in the accompanying drawings in which:

Fig. 1 is a perspective view of a shaping machine constructed in accordance with the invention; and Fig. 2 is a sectional detail view taken along lines 2—2 of Fig. 1.

Referring more particularly to the drawing, wherein like reference characters designate like or corresponding parts throughout the different views, 1 indicates generally the shaping device of the invention, having a base 29. A ram mount 27 is hinged at one end by a pin 31 to a pair of upright ears or standards 28 integral to the base 29. A pair of laterally spaced upright guide members 32 and 32a integral with base 29 and located adjacent the unhinged end thereof, provide a vertical guideway for ram mount 27 as it pivots about axis 31a. The upper surface of mount 27 is mortised to form a V-shaped slideway 9 to receive a reciprocable ram 10. An elongated ram retaining member 11 disposed immediately above ram mount 27 has its lower surface 12 cut to form an inverted V-shaped slideway, cooperating with slideway 9 to guide the ram 10. The retaining member 11 may be adjusted for proper movement of the ram 10 by a pair of thumbscrews 13, theadably received in vertical bores formed in spaced apart inverted U-shaped brackets 14 integral with ram retaining member 11 and having downardly depending legs integral to the sides of ram mount 27.

Power for reciprocating the ram 10 may be provided in any known manner not material to the invention as by manual or mechanical source (not shown).

The longitudinally spaced upright members 32, 32a are formed integral with the base 29 and are arranged in pairs spaced apart transversely (only one of each pair shown) for vertical movement of the ram mount 27 as it pivots about axis 31a. A template or cam 33 is mounted for transverse movement relative to the longitudinal axis for the ram mount 27 to actuate the ram mount vertically, by having its upper surface bearing against the under side of a wedge-shaped portion 34 integral with the rear end of the mount 27. Figure 2 illustrates one method of providing a slideway for the template 33, wherein the template 33 is seen as an inverted T-shaped groove 36 formed in base 29. Means for feeding the template under the ram mount 27 include a screw-threaded shaft 37 threadably received in a boss 38 integral to base 29. Shaft 37 is provided with a beveled gear 39 at one of its ends and is connected to the template 33 at its other end. An elongated shaft 40 is disposed in parallel relation to the base 29 and is journaled for free rotation in a pair of spaced bosses 41 extending laterally from the base 29, and is provided with a beveled gear 42 at one end thereof meshing with gear 39, and another bevel gear 43 mounted at the other end thereof. A similarly mounted shaft 44 is disposed at right angles to shaft 40 in a pair of spaced, laterally extending bosses 45 and is provided at one end thereof with a beveled gear 46 which meshes with gear 43 and at the other end thereof with a worm 47 adapted to mesh with a worm gear 48 mounted on a spindle shaft 49 journaled in an upright bearing 50. The work piece 23 is mounted at the other end of the shaft 49 and is held under the cutter 25. Pivoted to the forward portion of ram 10 is an arm 52 pivoted to a suitable support 53 integral to base 29 by a pin 54.

This arm is forked at one end thereof for pivotal attachment to a reciprocating shaft 55 by a pin 56. Both forked ends of the arm 52 in which pin 51 is received are slotted as at 57 and 58 in order to provide suitable play of the linkage assembly.

The shaft 55 slides in a boss 59 integral to base 29 and is provided with a fork 60 for pivotal connection of one end of a pawl 61 by pin 62. Pawl 61 is slidably mounted in bearing member 63 integral to base 29. The other end of pawl 61 cooperates with a ratchet wheel 64 mounted on shaft 44 and completes the assembly.

The operation is as follows:

As the ram 10 carrying the cutting tool 25 reciprocates forwardly in its slideways, arm 52 will be rotated and through the linkage will move pawl 61 rearwardly upon rearward movement of ram 10, the pawl in its rearward movement will cause ratchet wheel 64 to rotate counterclockwise and through the several gears will transmit motion to shaft 37, causing the template to move under the surface 34, providing vertical movement to ram mount 27. The shaft 44 having worm 47 mounted thereto will rotate worm gear 48 which will rotate shaft 49 to give rotation to workpiece 23. As the cut progresses along the face of conical workpiece the cut will be made on a helix to the axis.

The degree of the helix or any irregular angular direction from the axis of a conical workpiece may be obtained through a cam which controls the rotation of the conical workpiece to insure the correct distance for every stroke of the ram. As the ram returns to start a new cut the conical workpiece may be returned to its starting point by any suitable means, not shown.

The deepest and greatest breadths of cut is at the greatest diameter of the conical workpiece and diminishes proportionately to infinity at the apex.

The cam or template is an inverted, reverted image of the contour to be cut. The magnification of this unit is governed by the length of the work piece to the distance from the pivot to the cam or template on the ram base. For proper operation in cutting a conical workpiece, the apex of the workpiece should be superimposed upon the intersection of the pivot axes, and also the point of the tool.

It is apparent that a shaping machine has been devised that is more efficient than the existing machines and is faster in operation, providing a finer surface finish to the cut and is simple in operation.

While a preferred form of the invention has been shown and described, various modifications and substitutions of equivalents will occur to those skilled in the art after a study of the foregoing disclosure. Hence the disclosure should be taken in an illustrative rather than a limiting sense; and it is the desire and intention to reserve all modifications within the scope of the subjoined claims:

What is claimed is:

1. In a shaping machine, a base, a ram mount pivoting means carried by said base, an elongated ram mount pivoted at its forward end to said pivoting means and adapted to move in a vertical plane, vertical alignment means for said ram mount fixed on said base, a ram member provided with a cutting tool at its forward end, an elongated ram retaining member for said ram member, means for adjustably holding said ram member in position carried by said ram mount, said retaining member and said ram mount having longitudinal grooves mortised in their lower and upper faces respectively to provide slideways for said ram member, a work holding device adjustably mounted upon said base and adapted to hold a workpiece in machining relation to said tool cutter on said ram member, a template mounted transversely on the rearward portion of said base for controlling vertical movement of said ram mount, its upper surface adapted to bear against a wedge-shaped bearing surface formed in the lower rearward face of said ram mount, and means supported by said base for adjusting said template to control said vertical movement of said ram mount.

2. In a shaping machine as claimed in claim 1 wherein said means for adjusting said template to control the vertical movement of said ram mount comprises, a screw threaded template feeding shaft attached at its inner end to said template, said shaft threadably journaled in an upright boss upon said base, a beveled gear provided at the outer end of said screw-threaded shaft, a ratchet and pawl mechanism mounted upon the forward portion of said base, a pivoted lever connecting the forward end of said ram member and said pawl mechanism, a first shaft parallel to the axis of said template feeding shaft, said shaft carrying a ratchet wheel of said ratchet and pawl mechanism, a beveled gear carried by the outer end of said first shaft, a second elongated shaft mounted to the side of said base, said second shaft being disposed at right angles to said first shaft and said screw-threaded shaft, a beveled gear carried by each end of said second shaft, said gears meshing with said beveled gears on said screw-threaded shaft and said first shaft, a worm carried by the inner end of said first shaft, a work shaft connected at one end to said work holding device and in axial alignment to said ram member and a worm gear carried by the other end of said work shaft and meshing with said worm on said first shaft.

No references cited.